United States Patent
Shibata

(10) Patent No.: US 12,400,338 B2
(45) Date of Patent: Aug. 26, 2025

(54) SEARCH PROCESSING DEVICE, SEARCH PROCESSING METHOD, AND COMPUTER PROGRAM PRODUCT

(71) Applicant: KABUSHIKI KAISHA TOSHIBA, Tokyo (JP)

(72) Inventor: Tomoyuki Shibata, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 446 days.

(21) Appl. No.: 17/897,124

(22) Filed: Aug. 27, 2022

(65) Prior Publication Data

US 2023/0131717 A1  Apr. 27, 2023

(30) Foreign Application Priority Data

Oct. 27, 2021  (JP) .................................. 2021-175564

(51) Int. Cl.
*G06T 7/246* (2017.01)
*G06F 16/735* (2019.01)
(Continued)

(52) U.S. Cl.
CPC ............ *G06T 7/246* (2017.01); *G06F 16/735* (2019.01); *G06F 16/738* (2019.01);
(Continued)

(58) Field of Classification Search
CPC ........ G06V 20/52; G06V 20/50; G06V 20/58; G06T 7/20; G06T 2207/30232; B60R 2300/307; G01S 7/414
See application file for complete search history.

(56) References Cited

U.S. PATENT DOCUMENTS 8,886,634 B2   11/2014   Yoshio et al.
10,672,133 B2   6/2020   Shibata et al.
(Continued)

FOREIGN PATENT DOCUMENTS

JP          5586736 B2    9/2014
JP       2018198056 A    12/2018
(Continued)

OTHER PUBLICATIONS

Japanese Office Action (and an English language translation thereof) dated Dec. 10, 2024, issued in counterpart Japanese Application No. 2021-175564.

*Primary Examiner* — Chan S Park
*Assistant Examiner* — Chandhana Pedapati
(74) *Attorney, Agent, or Firm* — Holtz, Holtz & Volek PC

(57) ABSTRACT

A search processing device includes a memory and one or more processors coupled to the memory. The one or more processors are configured to: detect and track moving objects contained in videos by associating the moving objects with each other in a time sequence; receive setting of a search target contained in the videos; calculate a first descriptor and second descriptors, and calculate first degrees of similarity between the first descriptor and the second descriptors, the first descriptor indicating a feature of the search target and the second descriptors indicating features of the moving objects; and receive selection between a first display mode and a second display mode, and display search results corresponding to the search target on a display unit in the selected display mode.

10 Claims, 5 Drawing Sheets

(51) Int. Cl.
*G06F 16/738* (2019.01)
*G06F 16/783* (2019.01)
*G06T 7/292* (2017.01)
*G06V 10/46* (2022.01)
*G06V 10/74* (2022.01)

(52) U.S. Cl.
CPC .......... *G06F 16/7837* (2019.01); *G06T 7/292* (2017.01); *G06V 10/46* (2022.01); *G06V 10/761* (2022.01); *G06T 2207/10016* (2013.01); *G06T 2207/30232* (2013.01)

(56) References Cited

U.S. PATENT DOCUMENTS

| | | | |
|---|---|---|---|
| 10,891,740 B2 | 1/2021 | Shibata et al. | |
| 11,019,268 B2* | 5/2021 | Ida | H04N 23/63 |
| 11,113,583 B2 | 9/2021 | Kobayashi | |
| 11,158,176 B2* | 10/2021 | Rao | H04N 7/181 |
| 11,263,773 B2 | 3/2022 | Kobayashi | |
| 11,710,387 B2* | 7/2023 | Goulden | G06V 40/172 |
| | | | 382/118 |
| 2001/0010541 A1* | 8/2001 | Fernandez | G08B 13/19656 |
| | | | 348/E7.086 |
| 2005/0057653 A1* | 3/2005 | Maruya | H04N 7/181 |
| | | | 348/E7.086 |
| 2018/0139416 A1* | 5/2018 | Hirasawa | G08B 25/00 |
| 2018/0144074 A1 | 5/2018 | Yamaji et al. | |
| 2018/0341803 A1* | 11/2018 | Matsushita | G06V 40/161 |
| 2019/0286893 A1* | 9/2019 | Adachi | G06V 40/166 |

FOREIGN PATENT DOCUMENTS

| | | |
|---|---|---|
| JP | 2019160001 A | 9/2019 |
| JP | 6649232 B2 | 1/2020 |
| JP | 6659524 B2 | 2/2020 |
| JP | 2020154478 A | 9/2020 |
| JP | 2020154479 A | 9/2020 |
| JP | 6833617 B2 | 2/2021 |
| JP | 2021106330 A | 7/2021 |
| JP | 2021114050 A | 8/2021 |
| WO | 2009133667 A1 | 11/2009 |

* cited by examiner

SEARCH PROCESSING DEVICE, SEARCH PROCESSING METHOD, AND COMPUTER PROGRAM PRODUCT

CROSS-REFERENCE TO RELATED APPLICATIONS

This application is based upon and claims the benefit of priority from Japanese Patent Application No. 2021-175564, filed on Oct. 27, 2021; the entire contents of which are incorporated herein by reference.

FIELD

An embodiment described herein relates generally to a search processing device, a search processing method, and a computer program product.

BACKGROUND

Conventionally, there has been a known technique for inputting an image of a person as a search query and sequentially displaying, from among people appearing on cameras, people resembling the person.

However, when a search target has been captured by a plurality of cameras, conventional techniques are not capable of easily determining how many times the search target has been captured by each of the cameras.

DETAILED DESCRIPTION

According to an embodiment, a search processing device includes a memory and one or more processors coupled to the memory. The one or more processors are configured to: detect moving objects contained in videos and track the moving objects by associating the moving objects with each other in a time sequence; receive setting of a search target that is contained in the videos; calculate a first descriptor and second descriptors, and calculate first degrees of similarity between the first descriptor and the second descriptors, the first descriptor indicating a feature of the search target, and the second descriptors indicating features of the moving objects; and receive selection between a first display mode and a second display mode, and display search results corresponding to the search target on a display unit in the selected display mode, the first display mode being a mode in which moving objects having the first degrees of similarity greater than or equal to a first threshold among the moving objects are displayed, and the second display mode being a mode in which the moving objects are displayed in descending order of the first degrees of similarity with respect to each camera that has captured the corresponding video.

With reference to the accompanying drawings, the following describes an embodiment of a search processing device, a search processing method, and a computer program product in detail.

First, an example of the functional configuration of a search processing device according to the embodiment will be described.

Example of the Functional Configuration

Figure 1:
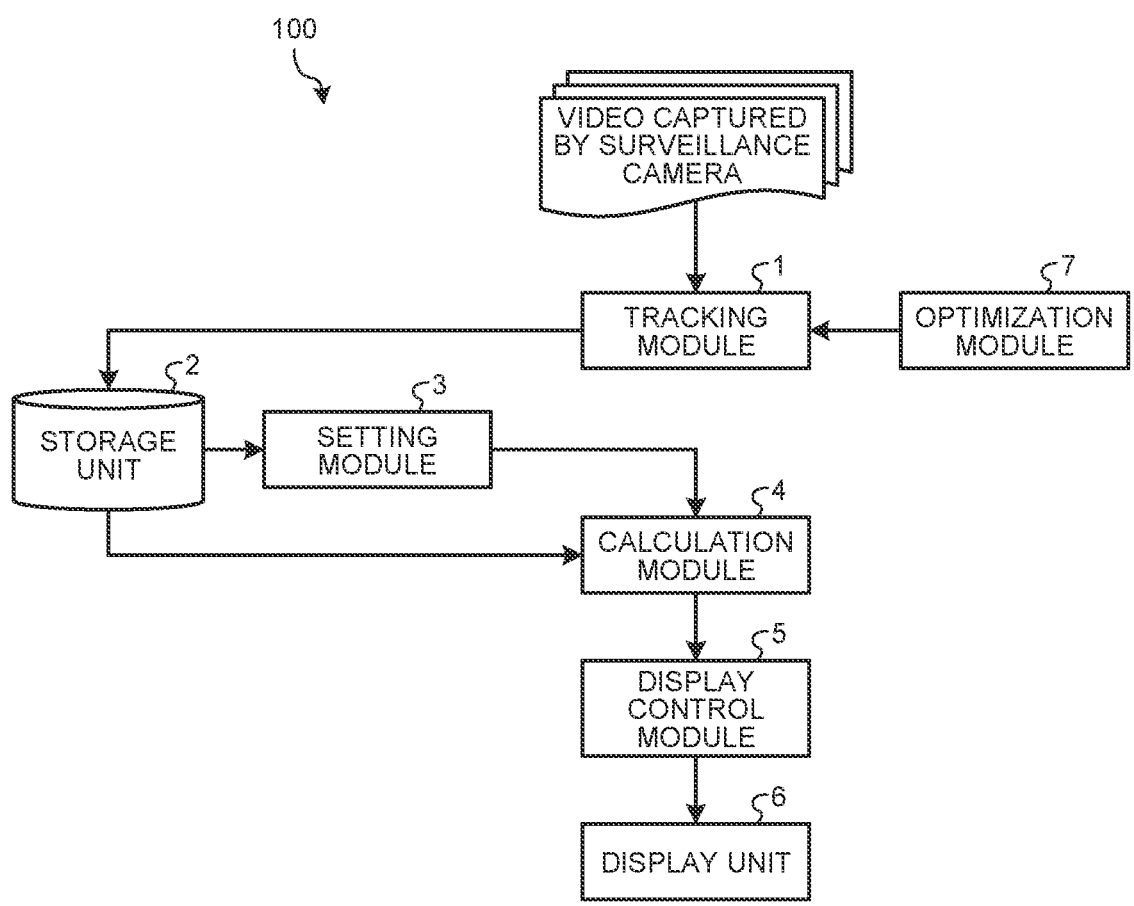
FIG. 1 illustrates an example of the functional configuration of a search processing device according to an embodiment.

FIG. 1 illustrates an example of the functional configuration of a search processing device 100 according to the embodiment. The search processing device 100 in the embodiment includes a tracking module 1, a storage unit 2, a setting module 3, a calculation module 4, a display control module 5, a display unit 6, and an optimization module 7.

Using information on moving objects obtained from respective videos captured by individual cameras, the tracking module 1 performs collective processing to associate these moving objects with the same moving object using a total optimization approach. Specifically, the tracking module 1 aggregates videos captured by individual cameras, estimates whether the same moving object is contained in videos, and collectively associates moving objects with the same moving object. Here, input information of videos may be streams or may be sequences of frame images.

Each of the moving object may be, but is not limited to, a person such as a pedestrian. The moving object may be any moving object such as a vehicle or a flying object.

In the present embodiment, the tracking module 1 performs tracking processing on videos captured by a group of surveillance cameras fixed at specific locations. In the tracking processing, the tracking module 1 detects people in the videos and associates, with each other, people that are the same person in temporally consecutive frame images. The tracking module 1 detects moving objects, for example, using a feature extraction model based on how moving objects (people in the embodiment) are visually recognized. For example, a method described in any one of Japanese Patent Application Laid-open No. 2020-154478 and Japanese Patent Application Laid-open No. 2020-154479 is used for person detection and person tracking in each of the cameras.

The following refers to a result of the person tracking as a "tracklet". The tracking module 1 stores the following in the storage unit 2 (e.g., a database): information on the coordinates of rectangles indicating the positions of people in frames; and cropped images in theses rectangles or in a range having certain margins added to these rectangles. When the cropped images in a range having the certain margins are stored, the cropped images contain, for example, ancillary objects (e.g., cane and wheelchair) of the person. Thus, the accuracy of person detection can be further improved by using such ancillary objects for the person detection.

The tracking module 1 gathers the coordinates information and the cropped images that correspond to several frames in which the person has been tracked (from which the tracklet has been obtained), and stores this coordinates information and these cropped images in the storage unit 2. Each of the tracklets also includes information for identifying individual cameras that have captured corresponding images.

The tracking module 1 constantly processes camera images and sequentially registers camera images and information such as the tracklet in the storage unit 2. The camera videos and the tracklet may be registered at the timing when additional information is no longer added to the tracklet after the tracking ends, or at a certain timing. The timing when additional information is no longer added to the tracklet after the tracking ends is, for example, the timing when a tracked person has moved outside the fields of view of the cameras, when person detection has failed, or when association between people has failed.

When information is registered in the storage unit 2 after the tracking is completed, results of the person search do not include any person who has continued to be captured by the cameras. If the tracklet is updated at the certain timing, the current location of a currently tracked person can also be searched for although there is a delay for a period corresponding to the update.

The setting module 3 sets a person as a search target. For example, the setting module 3 may set a person as a search target in response to designation of the person by a user. Any desired method may be used for designation of the person by a user. For example, the setting module 3 may use a reception unit (not illustrated in FIG. 1) to receive designation of a person in the videos as the person to be set as the search target. The following describes the reception unit by using a graphical user interface (GUI) as an example. However, a GUI is not a limiting example, and a physical button such as a character user interface (CUI) or a keyboard may be used alternatively. Specifically, the setting module 3 may receive designation of a person as the search target using a GUI that receives a click on the person in the videos. For example, the setting module 3 may receive designation of a person as the search target by receiving a result of selection where a tracklet corresponding to the person to be set as the search target is selected from display information that contains one or more tracklets accumulated in the storage unit 2. Specifically, when being configured to receive designation of a person as the search target from the outside, the reception unit is not limited to a GUI but may be a device such as a camera or a scanner.

For example, the setting module 3 may use an image recognition technique to automatically set, as the search target, a person that satisfies a previously specified condition such as a specific action or behavior.

When the setting module 3 receives a person set as the search target from the user, a search query for performing a search for the person is determined. By performing the search using the search query, the same person as or a person similar to the person set by the setting module 3 is displayed on the display unit 6. The setting module 3 may receive a setting such as the size of a person and a time zone, and may be enabled to mask the search result displayed. In other words, the setting module 3 may further receive setting of at least one range that is at least one of a range of the size of the search target and a range of dates and times when the search target appears, and the display control module 5 may avoid displaying search results not included in the at least one range.

The calculation module 4 calculates (extracts) descriptors to be used for determining the similarity between the person specified using the search query and each person included in the cropped images accumulated in the storage unit 2. Any method for extracting the descriptor of each person may be used. For example, any one of the methods described in Japanese Patent No. 6659524 and Japanese Patent No. 6833617 may be used for extracting the descriptor of each person. In Japanese Patent No. 6659524 and Japanese Patent No. 6833617, the descriptor of a person in the tracklet is expressed as a vector or a subspace. The calculation module 4 extracts descriptors for identifying people as the same person from how those people are visually recognized, such as the whole bodies of the people.

The timing when the descriptors are extracted is when each tracklet is registered in the storage unit 2 or updated. The calculation module 4 assumes the registered or updated tracklet as one for which the descriptors are calculated.

Subsequently, the calculation module 4 uses the descriptors to calculate the degree of similarity indicating the similarity between the person specified using the search query and each person contained in the cropped images accumulated in the storage unit 2.

The similarity is calculated, for example, in the form of the distance between vectors or the degree of cosine similarity. The calculation module 4 normalizes a range of values indicating the similarity and calculates the degree of similarity that can take a value between 0 and 1. When the descriptors are expressed as subspaces, the degree of similarity between the spaces is calculated using a method, such as the mutual subspace method, in the same manner as when the descriptors are expressed as vectors.

The calculation module 4 also calculates the ranking of the degrees of similarity for each camera.

The calculation module 4 may receive the specification of a target person from the user through a GUI that receives the narrowing down of the target person, and calculate the degree of similarity between those limited by the specification among the people in the videos stored in the storage unit 2 and the person identified by the search query. Specifically, the target person is narrowed down based on information such as a time slot when and cameras by which the person has been captured.

The display control module 5 controls display of display information to be displayed on the display unit 6. For example, the display information includes information such as the degrees of similarity obtained by the calculation module 4, the tracklets (search results) corresponding to people with which the degrees of similarity have been obtained, and the ranking of the degrees of similarity in each of the cameras. The people in the search results are displayed in cropped images from camera images, for example. For example, each of the search results is displayed in a video or an animation with respect to a person in the tracking results in the individual cameras.

The display unit 6 displays the display information. Examples of display information are described below using FIGS. 2 and 3.

Using the tracking results obtained by the tracking module 1, the optimization module 7 optimizes a feature extraction model by performing adaptive learning in which the feature extraction model is adapted to the installation environment of the cameras. The feature extraction model is based on how a moving object (a person in the embodiment) is visually recognized. In the adaptive learning, for example, learning is conducted using videos actually captured by the cameras installed in the installation environment.

For calculating descriptors, for example, a feature extractor is used that has learned, based on how people are visually recognized, feature expressions that are close for people that are the same person and are distant for people that are different people. When people captured by a plurality of cameras with different capturing conditions (e.g., lighting and [the] distance to a subject) are subjects of the learning, the scales of resulting degrees of similarity are different camera by camera. Both when a person captured by a camera is similar to the search query and when the person is not the search query, the following tendencies hold: the degree of similarity between the search query and the person is slightly higher provided that the search query and the person have been captured in similar environments; and the degree of similarity between the search query and the person is slightly lower provided that the search query and the person have been captured in different environments.

Therefore, treating the degrees of similarity of people from all cameras uniformly and displaying the results in descending order of the degrees of similarity may result in inclusion of people different from the search query in the highest-ranking results. This makes it difficult to check which cameras have captured a person set as the search target and how many times the person has been captured by each camera. Therefore, the display control module 5 selects and displays information in a display mode selected from: a first display mode in which people with the degrees of similarity that are greater than or equal to a predetermined threshold are displayed, with respect to each camera; and a second display mode in which the search results for a specific one or more of the cameras are displayed in order of the degrees of similarity.

Example of First Display Mode

Figure 2:
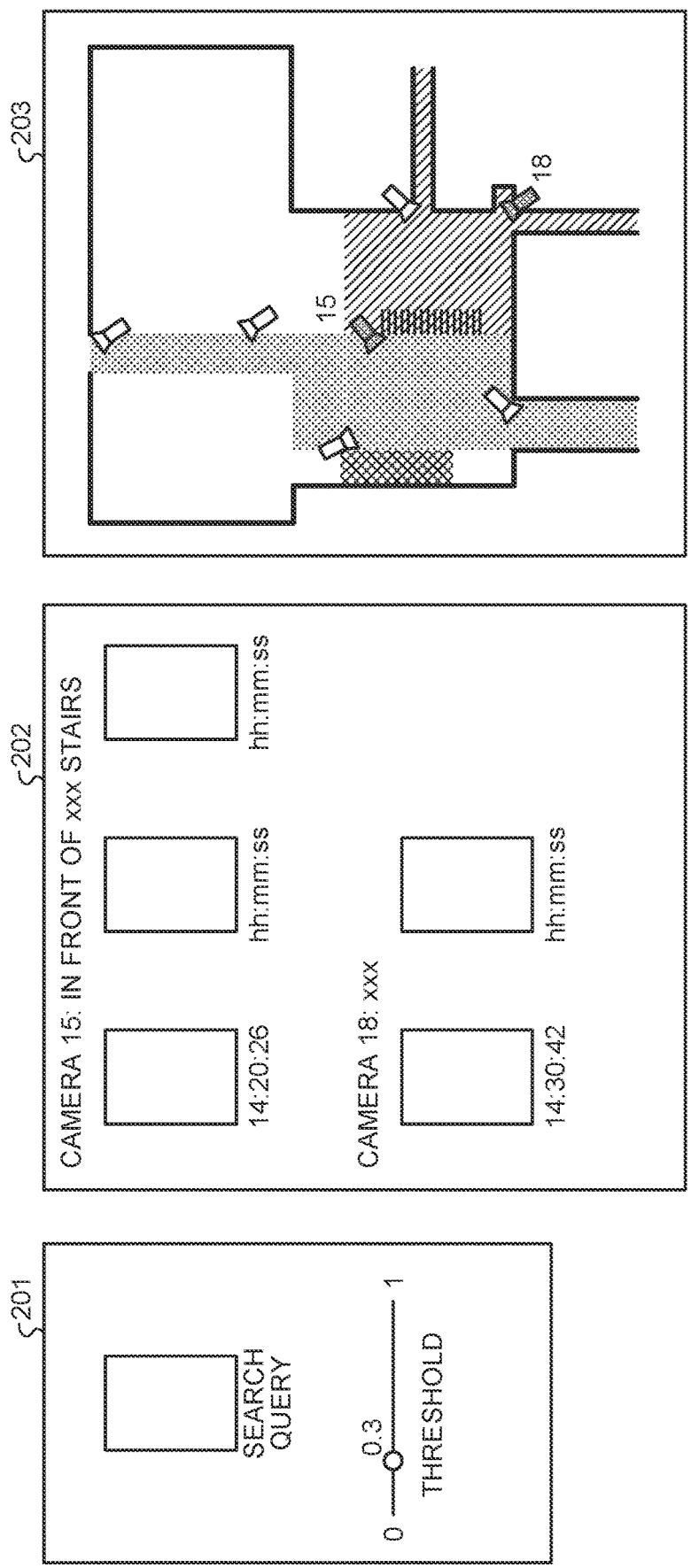
FIG. 2 illustrates a first example (first display mode) of display information according to the embodiment.

FIG. 2 illustrates a first example (the first display mode) of the display information according to the embodiment. The display information in the first display mode includes display areas 201 to 203.

The display area 201 includes the search query and a GUI through which the threshold is adjusted.

The display area 202 displays search results grouped by camera in descending order of the degrees of similarity to the search query. Information displayed in the display area 202 includes: an image (e.g., a cropped image cut out from an image) of a person; camera information indicating information such as camera numbers and the locations of the cameras; the dates when images have been captured; and the times when the images have been captured. A plurality of temporarily successive images of people are accumulated in a tracklet. For this reason, the images of people may be displayed as GIF animations. Clock times at which people have been first detected is displayed around the corresponding crop images.

The display area 203 displays placement information (e.g., a drawing or a map) indicating the placement of the cameras. For example, the display control module 5 highlights and displays, on the map, the cameras (the cameras having the camera numbers 15 and 18 in the example in FIG. 2) from each of which a person corresponding to the degree of similarity greater than or equal to a predetermined threshold are retrieved.

The first display mode in which people corresponding to the degrees of similarity greater than or equal to the predetermined threshold are displayed with respect to each camera is used, for example, to screen which cameras have captured the person set as the search target. In the first display mode, a person captured by each camera is displayed in a time sequence, for example. Information from cameras that have not captured any images of the person set as the search target (i.e., cameras that have captured only people corresponding to the degrees of similarity less than the certain threshold) may be excluded from the display information.

Any value within the range of values can be selected as the threshold, and the search results displayed differ depending on the threshold. Therefore, the display control module 5 places, in the display information (in the example in FIG. 2, display area 201), a GUI part that receives the selection of the threshold so that the search results can be changed interactively.

In the present embodiment, the threshold is actually a value in a continuous range between 0 and 1. However, a GUI part that receives the selection of the threshold from a range of discrete values may be included in the display information. The discrete values are, for example, level indications such as low, medium, and high.

When displaying the search results, the display control module 5 may display the degrees of similarity to the search query together. The degrees of similarity may be expressed using discrete numerical values or may be displayed using bars that indicate the corresponding degrees of similarity with color gradation.

When a map is used as the placement information, the map to be displayed may be any one that represents at least the positional relationship of the cameras, such a hand-drawn map or a map on which the fields of view and the directions of the optical axes of the cameras, for example, are depicted.

When locations of a person can be mapped onto the map with each camera calibrated previously, the locations of the person may be indicated by elements such as icons. Icons are, for example, dots or circles.

One possibility is that an unintended different person (a person not the same as the search query) may appear as a search result and becomes an obstacle to finding a person desired to find. The setting module 3 may further receive setting of an exclusion target to be excluded as the search target. This enables, for example, search results for a particular person to be prevented from being displayed. Specifically, the calculation module 4 calculates a third descriptor indicating the feature of the exclusion target and second descriptors indicating the features of individual moving objects included in the video, and calculates degrees of similarity (second degrees of similarity) between the second descriptors and the third descriptor. Thereafter, displaying of moving objects having the second degrees of similarity greater than or equal to a second threshold among the moving objects is disabled in the first and the second display modes.

For example, the display control module 5 displays a menu in response to a right-click on an image of a person in the search results and interactively receives, via the menu, setting (setting as an exclusion target) of an intention not to display the corresponding search results.

In this case, the display control module 5 does not perform display control for a tracklet thus set as the exclusion targets; however, it is still possible to cause the calculation module 4 to calculate the degrees of similarity with the descriptor of the exclusion target and the ranking of these degrees of similarity because the descriptors have been previously extracted from tracklets for all of the moving objects. Therefore, when the setting module 3 receives the setting of a search query for search for a tracklet set as the exclusion target, the display control module 5 may, based on the degrees of similarity with the descriptor of the exclusion target indicated by the search query and the ranking of these degrees of similarities, additionally avoid displaying tracklets (tracklets similar to that of the exclusion target) corresponding to the degrees of similarity that are greater than or equal to a threshold for determining the exclusion target. That is, the display control module 5 may avoid displaying another person estimated to be the same person as a person set not to be displayed. Herein, the threshold that is used for determining similarity with the exclusion target is, for example, set to be higher than the threshold that is used for determining similarity for people to be displayed.

Furthermore, with respective attribute values of tracklets previously calculated by the calculation module 4 using a people attribute recognition technique, the setting module 3 may receive specification of a particular one of the attribute values as an option for search. This configuration enables search results only for people wearing suits to be displayed, or people in their 20s to be excluded as search results, for example. As the people attribute recognition technique, for example, the technique disclosed in Japanese Patent No. 6649232 may be employed.

Furthermore, with the display control module 5 displaying a GUI for receiving selection of a new search query from search results displayed on the display unit 6, the setting module 3 may set a search target to the search query selected via the GUI. This configuration enables, for example, the user to newly select a person of interest as a search query.

Next, the second display mode is described in which search results for a specific camera are displayed in descending order of the degrees of similarity.

Example of Second Display Mode

Figure 3:
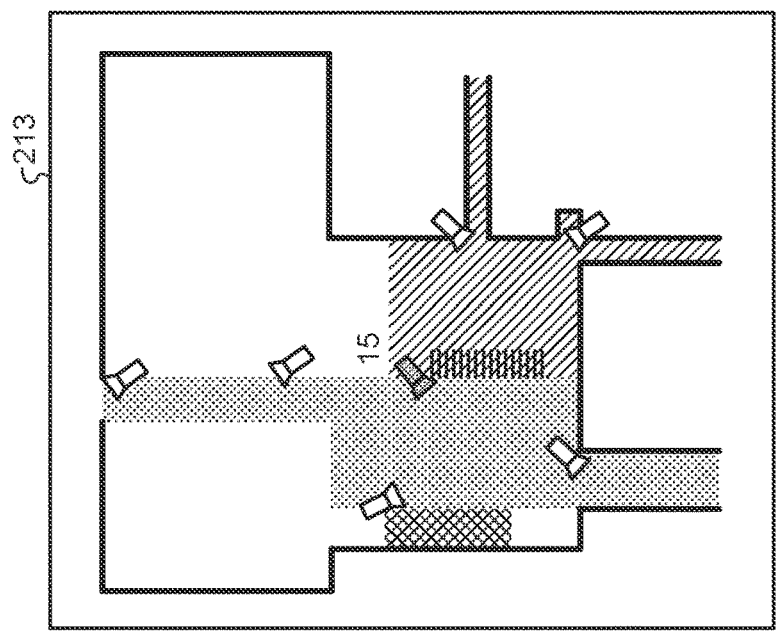
FIG. 3 illustrates a second example (second display mode) of the display information according to the embodiment.
Figure 3:
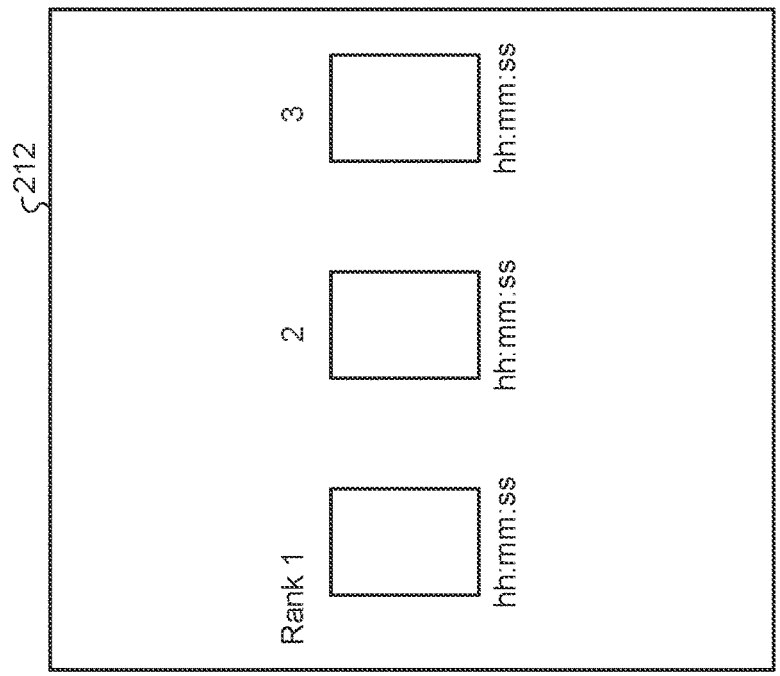
Figure 3:
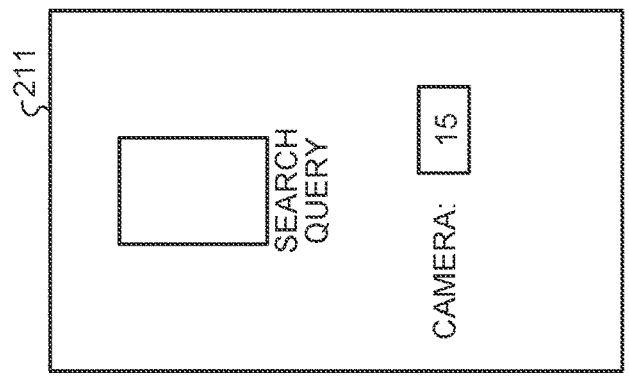

FIG. 3 illustrates a second example (the second display mode) of the display information according to the embodiment. The display information in the second display mode includes display areas 211 to 213.

The display area 211 includes the search query and identification information for identifying the specific camera (the camera having the camera number of 15 in the example of FIG. 3).

The display area 212 displays search results for the specific camera in descending order of the degrees of similarity with the search query.

The display area 213 displays placement information (e.g., a drawing or a map) indicating the placement of the cameras. For example, the display control module 5 highlights and displays the specific camera on the map.

The second display mode displays detailed information on the specific camera, for which the search results are viewed. The display information in the second display mode is displayed when a user has selected a specific camera via a GUI that receives specification of a camera number. Specification of the camera may be implemented in such a manner that the camera ID thereof is specified when the cameras are managed by the camera IDs or that the position of the camera is specified by a mouse or the like. One camera or a plurality of cameras may be specified.

While the search results are displayed in the order of the degrees of similarity, the number of search results to be displayed may be enabled to be set. The number of search results that can be displayed on the screen is limited. For this reason, when the number of search results exceeds the number of search results that can be displayed, the display control module 5 may enable such a user interface (UI) as a scroll bar. Alternatively, the display control module 5 may display the search results in a plurality of lines at one time.

When having determined that a person set as the search query has been captured repeatedly by the same camera, the display control module 5 may be configured to display that information on the display unit 6. Alternatively, the search processing device 100 may be configured to inform a user of that information by outputting sound, highlighting the person, or the like.

Furthermore, the search processing device 100 may be configured to inform a user also when a condition has been satisfied, other than that a person set as the search query has been captured repeatedly by the same camera. For example, the search processing device 100 may be configured to inform a user also when the person has moved from a camera A to a camera B, returned to the camera A, and then moved to the camera B, that is, when the person has moved between previously specified cameras. The display control module 5 displays, on the display unit 6, a GUI for setting such a condition.

Example of Search Processing Method

Figure 4:
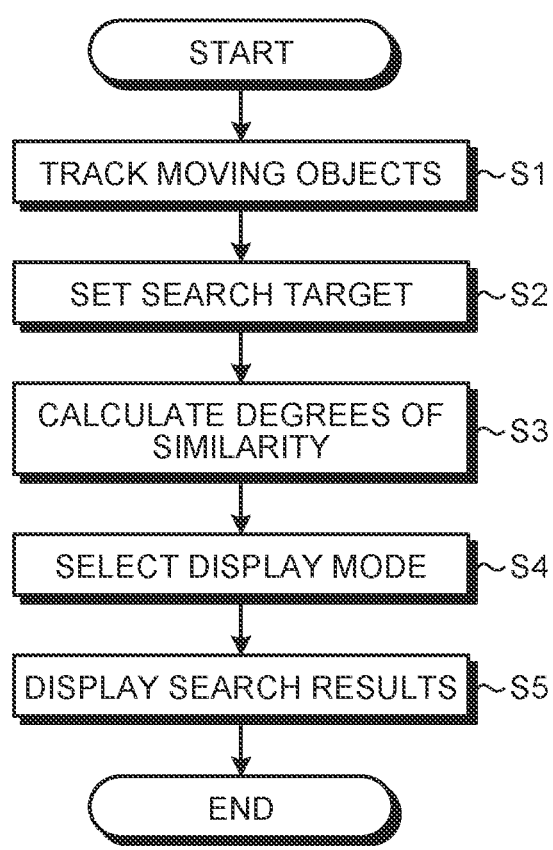
FIG. 4 is a flowchart illustrating an example of a search processing method according to the embodiment.

FIG. 4 is a flowchart illustrating an example of the search processing method according to the embodiment. At the start, the tracking module 1 detects moving objects (people in the embodiment) contained in videos, and tracks the moving objects by associating the moving objects with each other in a time sequence (step S1). Subsequently, the setting module 3 receives setting of a search target contained in the videos (step S2). Subsequently, the calculation module 4 calculates a first descriptor indicating the feature of the search target and second descriptors indicating the features of the individual moving objects, and calculates degrees of similarity (first degrees of similarity) between the first descriptor and the second descriptors (step S3).

Subsequently, the display control module 5 receives selection of one of: the first display mode for displaying moving objects having the first degrees of similarity greater than or equal to a threshold (a first threshold) among the moving objects; and the second display mode for displaying the moving objects in descending order of the first degrees of similarity with respect to each camera that has captured the corresponding video (step S4). Subsequently, the display control module 5 displays, on the display unit 6, search results corresponding to the search target in the display mode selected in the processing at step S4 (step 35).

As described above, according to the search processing device 100 in the embodiment, how many times a search target has been captured by each camera can be easily determined. For example, in some manner or another, the search processing device 100 makes it possible to view with ease which camera has captured a person specified as the search target and what behavior the person has conducted while being captured by the camera. For example, even if the ranges of values for the degrees of similarity are different among the cameras, the first display mode enables a user to roughly screen the cameras that possibly have captured images of the search target. Furthermore, using the second display mode in which search results are displayed in the order of similarity, the user can check the details of the search targets with a specific camera.

In conventional techniques, search results from a plurality of cameras among which the degrees of similarity in different ranges are displayed in the order of the degrees of similarity, making the list less useful, for example, when looking at which camera has captured a search target and how many times each camera has captured the search target.

Lastly, an example of a hardware configuration in a diagram illustrating an example of the hardware configuration of the search processing device 100 in the embodiment is described.

Example of Hardware Configuration

Figure 5:
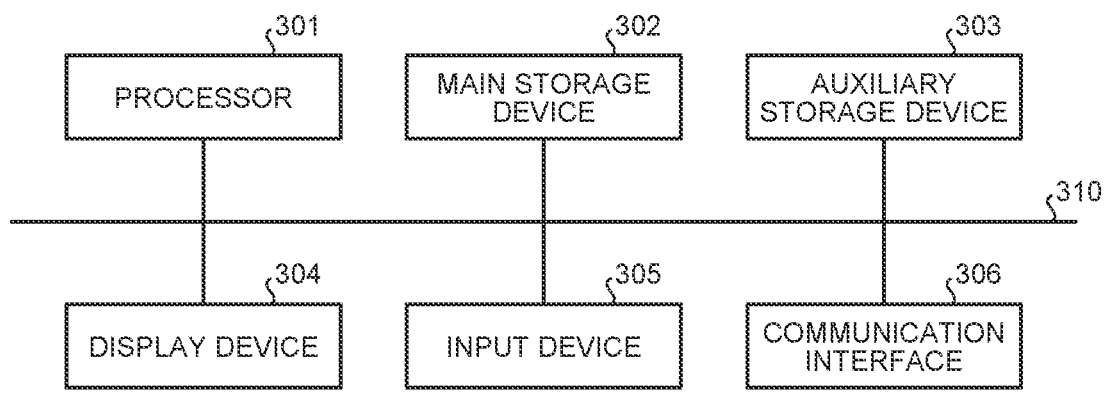
FIG. 5 illustrates an example of the hardware configuration of the search processing device according to the embodiment.

FIG. 5 illustrates an example of the hardware configuration of the search processing device 100 according to the embodiment. The search processing device 100 includes a processor 301, a main storage device 302, an auxiliary storage device 303, a display device 304, an input device 305, and a communication interface 306. The processor 301, the main storage device 302, the auxiliary storage device 303, the display device 304, the input device 305, and the communication interface 306 are connected to one another via a bus 310.

The processor 301 executes a computer program read from out from the auxiliary storage device 303 onto the main storage device 302. The main storage device 302 is a memory such as a read-only memory (ROM) or a random access memory (RAM). The auxiliary storage device 303 is a hard disk drive (HDD) or a memory card, or the like.

The display device 304 displays the above-described display information (see FIGS. 2 and 3) and other information. The input device 305 receives input from a user. The communication interface 306 is an interface for connection to the search processing device 100.

The search processing device 100 may be configured not to include the display device 304 and the input device 305. When the search processing device 100 does not include the display device 304 and the input device 305, a display function and an input function of an external terminal connected thereto via the communication interface 306 may be used instead, for example.

A computer program to be executed by the search processing device 100 is stored in a computer-readable storage medium such as a compact disc read only memory (CD-ROM), a memory card, a compact disc recordable (CD-R), or a digital versatile disc (DVD) to be provided as a computer program product in an installable or executable format file.

A computer program to be executed by the search processing device 100 may be configured to be stored on a computer connected to a network, such as the Internet, to be provided by being downloaded via the network.

A computer program to be executed by the search processing device 100 may be configured to be provided via a network, such as the Internet, without being downloaded.

A computer program to be executed by the search processing device 100 may be configured to be provided by being previously embedded in a ROM or the like.

A computer program to be executed by the search processing device 100 has a modular structure that includes functions in the functional configuration of the above-described search processing device 100 (see FIG. 1) that are implementable as a computer program. The functions that are implementable as a computer program are loaded into the main storage device 302 with the processor 301 reading and executing the computer program from a storage medium such as the auxiliary storage device 303. That is, the functions that are implementable as a computer program are generated on the main storage device 302.

Any one or two, or all of the functions of the search processing device 100 may be implemented by hardware such as an integrated circuit (IC).

When a plurality of processors are used to implement the individual functions, each of the processors may implement one of the functions or may implement two or more of the functions.

A computer or computers configured to implement the search processing device 100 may operate in any form. For example, the search processing device 100 may be implemented by a single computer. Alternatively, for example, the search processing device 100 may be configured to operate as a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A search processing device comprising:
a memory; and
one or more processors coupled to the memory and configured to:
    detect moving objects contained in videos captured by a plurality of cameras and track the moving objects by associating the moving objects with each other in a time sequence;
    receive setting of a search target that is contained in the videos;
    calculate a first descriptor and second descriptors, and calculate first degrees of similarity between the first descriptor and the second descriptors, the first descriptor indicating a feature of the search target, and the second descriptors indicating features of the moving objects; and
    receive selection between a first display mode and a second display mode, and display search results corresponding to the search target on a display device in a selected display mode,
    wherein the first display mode is a mode in which videos captured by at least two cameras among the plurality of cameras are targeted and moving objects in the targeted videos having the first degrees of similarity greater than or equal to a first threshold among the moving objects are displayed along with information identifying each of the at least two cameras, and
    wherein the second display mode is a mode in which videos captured by one designated camera among the plurality of cameras are targeted and the moving objects in the targeted videos are displayed along with information identifying the one designated camera in descending order of the first degrees of similarity of the moving objects beginning with a moving object whose first degree of similarity to the search target is ranked highest.

2. The device according to claim 1, wherein the one or more processors are configured to:
determine a search query from the setting of the search target; and
display, on the display device, display information including the search query, the search results, and placement information indicating placement of the cameras.

3. The device according to claim 2, wherein the one or more processors are configured to highlight and display a position of a camera having captured videos that include the search results, among the cameras the placement of which is indicated in the placement information.

4. The device according to claim 1, wherein the one or more processors are configured to:
further receive setting of a moving object to be set as an exclusion target that is excluded as the search target;
calculate a third descriptor indicating a feature of the exclusion target and the second descriptors, and calculate second degrees of similarity between the third descriptor and the second descriptors; and not display, in the first and the second display modes, moving objects having the second degrees of similarity greater than or equal to a second threshold among the moving objects.

5. The device according to claim 1, wherein the one or more processors are further configured to:
perform adaptive learning in which a feature extraction model is adapted to an installation environment of the cameras by using a tracking result obtained by the tracking of the moving objects, to optimize the feature extraction model, the feature extraction model being based on how the moving objects are visually recognized; and
detect the moving objects by using the feature extraction model.

6. The device according to claim 1, wherein the one or more processors are configured to receive setting of the search target via a reception unit configured to receive specification of the search target from the videos.

7. The device according to claim 1, wherein the one or more processors are configured to receive setting of the search target via a reception unit configured to receive specification of the search target from the search results.

8. The device according to claim 1, wherein the one or more processors are configured to:
further receive setting of at least one of a range of a size of the search target and a range of dates and times when the search target appears; and
not display search results not included in the at least one range.

9. A search processing method comprising:
detecting moving objects contained in videos captured by a plurality of cameras and tracking the moving objects by associating the moving objects with each other in a time sequence;
receiving setting of a search target that is contained in the videos;
calculating a first descriptor and second descriptors, and calculating first degrees of similarity between the first descriptor and the second descriptors, the first descriptor indicating a feature of the search target, and the second descriptors indicating features of the moving objects; and
receiving selection between a first display mode and a second display mode, and
displaying search results corresponding to the search target on a display device in a selected display mode,
wherein the first display mode is a mode in which videos captured by at least two cameras among the plurality of cameras are targeted and moving objects in the targeted videos having the first degrees of similarity greater than or equal to a first threshold among the moving objects are displayed along with to information identifying each of the at least two cameras, and
wherein the second display mode is a mode in which videos captured by one designated camera among the plurality of cameras are targeted and the moving objects in the targeted videos are displayed along with information identifying the one designated camera in descending order of the first degrees of similarity of the moving objects beginning with a moving object whose first degree of similarity to the search target is ranked highest.

10. A computer program product comprising a non-transitory computer-readable medium including programmed instructions, the instructions causing a computer to execute processes comprising:
detecting moving objects contained in videos captured by a plurality of cameras and tracking the moving objects by associating the moving objects with each other in a time sequence;
receiving setting of a search target that is contained in the videos;
calculating a first descriptor and second descriptors, and calculating first degrees of similarity between the first descriptor and the second descriptors, the first descriptor indicating a feature of the search target, and the second descriptors indicating features of the moving objects; and
receiving selection between a first display mode and a second display mode, and
displaying search results corresponding to the search target on a display device in a selected display mode,
wherein the first display mode is a mode in which videos captured by at least two cameras among the plurality of cameras are targeted and moving objects in the targeted videos having the first degrees of similarity greater than or equal to a first threshold among the moving objects are displayed along with information identifying each of the at least two cameras, and
wherein the second display mode is a mode in which videos captured by one designated camera among the plurality of cameras are targeted and the moving objects in the targeted videos are displayed along with information identifying the one designated camera in descending order of the first degrees of similarity of the moving objects beginning with a moving object whose first degree of similarity to the search target is ranked highest.

* * * * *